July 2, 1929.  B. M. DES JARDINS  1,719,692
REFRIGERATING APPARATUS AND PROCESS FOR REFRIGERATION
Filed March 21, 1924  3 Sheets-Sheet 1
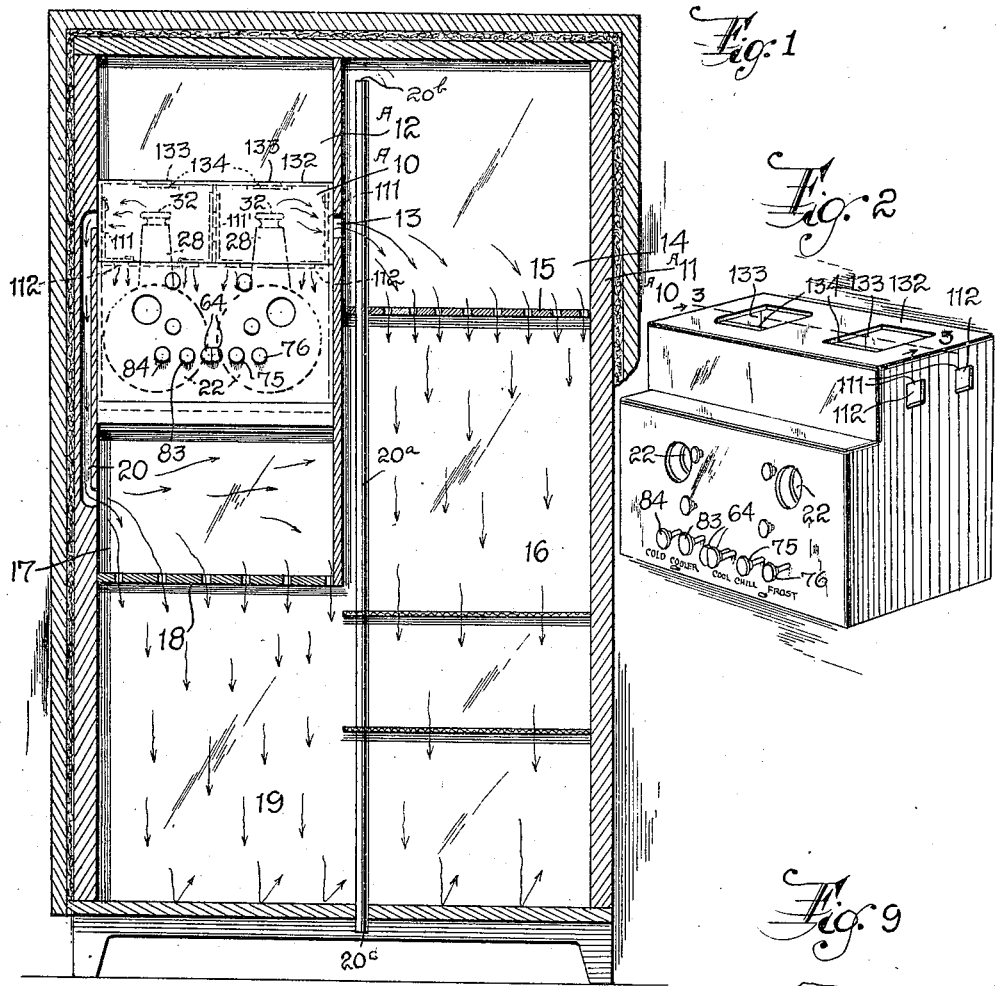
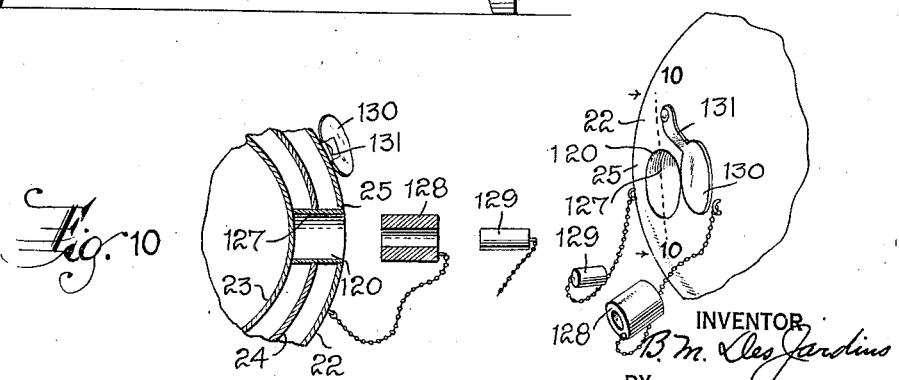

July 2, 1929. B. M. DES JARDINS 1,719,692
REFRIGERATING APPARATUS AND PROCESS FOR REFRIGERATION
Filed March 21, 1924 3 Sheets-Sheet 2

INVENTOR
B. M. Des Jardins
BY Braselton
Whitcomb & Des Jardins
ATTORNEYS

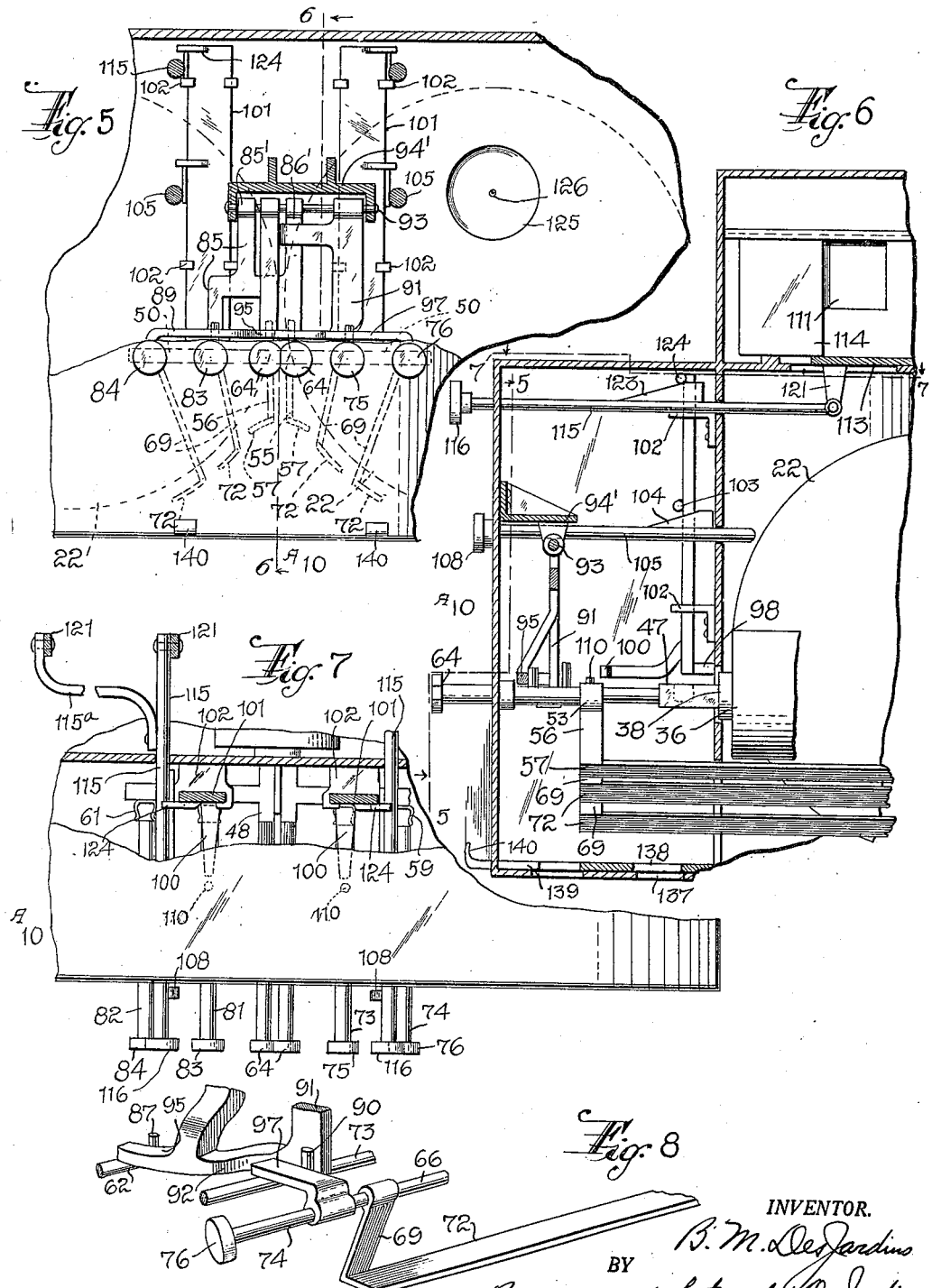

Patented July 2, 1929.

1,719,692

UNITED STATES PATENT OFFICE.

BENJAMIN M. DES JARDINS, OF WEST HARTFORD, CONNECTICUT.

REFRIGERATING APPARATUS AND PROCESS FOR REFRIGERATION.

Application filed March 21, 1924. Serial No. 700,810.

My invention relates to a novel refrigerating apparatus and process for refrigeration.

The chief object of my invention is to provide a simple and efficient refrigerating apparatus which can be manufactured and installed at a low cost and which is particularly well adapted for household use.

A further object of my invention is to provide a refrigerating apparatus in which the refrigeration is produced by the evaporation of a liquefied gas or gases, and the gases or liquids employed are used at substantially atmospheric pressure so that this apparatus does not involve the use of complicated and expensive coils, valves and containers such as are used for storing and controlling gases under pressures above atmospheric.

A further object of my invention is to provide a refrigerating apparatus, in which the degree of refrigeration produced is under the complete control of the user, and simple but adequate means are provided by which the user can regulate and govern the reduction in temperature produced by the apparatus.

Another object of my invention is to provide a refrigerating apparatus in which the reduction in temperature is produced by the evaporation of a liquefied gas, which is normally insulated from the external atmosphere to prevent the transfer of heat from the atmosphere to the body of liquefied gas, the degree of refrigeration being regulated by controllable means for transmitting heat from the external atmosphere to the body of liquefied gas. I propose to control the degree of refrigeration by controlling the rate at which heat is transmitted to the body of liquefied gas or preventing the flow of heat thereto when refrigeration is not needed.

A further object of my invention is to provide a refrigerating apparatus constituting a relatively small, self-contained unit, which can be readily placed within or removed from the usual refrigerator of the type common for household use, it being an object of my invention to provide a unit such that a charged unit may be readily placed in the refrigerator after the manner in which a cake of ice is placed in the icebox in accordance with the present practice, the unit, when discharged, being removed from the refrigerator and replaced by a freshly charged unit, or fresh liquid may be poured into the empty container.

A further object of my invention is to provide a refrigerating apparatus in which the reduction of temperature is produced by the evaporation of a liquefied gas and in which one or more different liquefied gases may be employed so that the compartments of the refrigerator may be filled with a selected gas or a mixture of selected gases as the user may desire. This permits the filling of the refrigerator compartments with an inert gas, for instance, having preservative properties, or a mixture of two or more gases in proportions determined by the rates at which the respective liquefied gases are permitted to evaporate.

A further object of my invention is to provide a refrigerating apparatus in which a reduction of temperature is secured by the evaporation of a liquefied gas and the vaporized gases may be confined or retained in a compartment surrounding the container for the liquefied gas so as to provide a relatively cold atmosphere around the container and controlling the rate of evaporation of the liquefied gas.

Another object of my invention is to provide a refrigerating apparatus in which the refrigeration is produced by the evaporation of a liquefied gas and means are provided for preventing the choking, by accumulated frost, of the outlet from the receptacle containing the body of liquefied gas.

A further object of my invention is to provide an improved process of refrigeration according to which the reduction of temperature is produced by the evaporation of a liquefied gas and is controlled by regulating the transfer of heat from the external atmosphere to the body of liquefied gas.

Another object of my invention is to provide an improved process of refrigeration by which a controlled reduction of temperature may be secured and, at the same time, the compartment to be refrigerated may be flooded with a selected gas or mixture of gases. It is an object of my invention to provide a process of refrigeration by which the normal air may be reconstituted and the compartments of the refrigerator flooded with a mixture of gases in such proportions as to correspond to the normal air.

Further objects, and objects relating to details and economies of construction and operation, will definitely appear from the detailed description to follow. In one instance, I accomplish the objects of my invention by the devices and means described in the following specification. My invention is clearly set forth and defined in the appended claims. An apparatus constituting one embodiment of my invention is illustrated in the accompanying drawings, forming a part of this specification, in which:

Fig. 1 is a vertical, sectional view through a refrigerator showing, in elevation, a refrigerating unit embodying my invention in place therein.

Fig. 2 is a perspective view of the refrigerating unit shown in Fig. 1.

Fig. 5 is a fragmentary view of the unit in front elevation, a part of the front wall being broken away to show the control mechanism, taken on line 5—5 of Fig. 6.

Fig. 6 is a fragmentary, vertical, sectional view, taken substantially on the line 6—6 of Fig. 5.

Fig. 7 is a fragmentary plan view of a portion of the unit showing the control keys, taken on the line 7—7 of Fig. 6.

Fig. 8 is a perspective, fragmentary view of the controllable heat leak mechanism by means of which heat is transferred at a regulatable rate from the external atmosphere to the body of liquefied gas.

Fig. 9 is a perspective view of a portion of a heat-insulated container for a liquefied gas showing a modified form of controllable heat leak.

Fig. 10 is a detail, sectional view, taken on the line 10—10 of Fig. 9, and

In the drawings, the same reference numerals refer to the same parts throughout the several views and the sectional views are taken looking in the direction of the arrows at the ends of the section lines.

Figure 3:
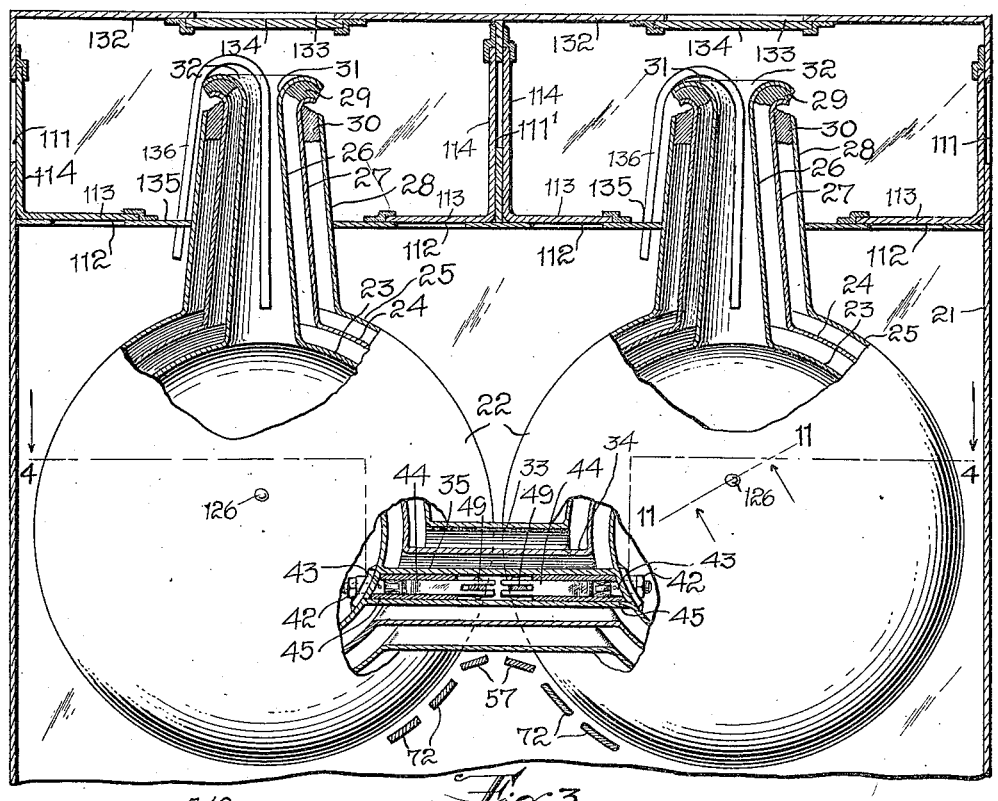
Fig. 3 is an enlarged, fragmentary, sectional view through the unit, taken substantially on the line 3—3 of Fig. 2.

In general, my invention consists in producing refrigeration by the controlled evaporation of a liquefied gas. I propose to use a substance which is a gas at normal temperatures and pressures and which has been liquefied. Such a liquid will return to the gaseous state provided the necessary heat of evaporation is supplied to it and I propose to control the evaporation of the liquefied gas, and, consequently, the degree of refrigeration, by regulating the rate at which heat is supplied to the body of liquefied gas. The temperature of the compartment to be refrigerated is reduced by the abstraction of the heat units necessary for evaporation, first from the heat conducting compartment and then from the atmosphere in said storage compartments and by the discharge of the cold gas resulting from evaporation into the compartments. I propose to use a heat-insulated container for the liquefied gas and to provide means by which, at the will of the user, heat may be conducted from the external atmosphere to the body of liquefied gas contained within such container. The liquefied gas in the container, and the gas resulting from its evaporation, are preferably maintained at atmospheric pressure so as to avoid the use of the complicated and expensive coils and containers necessary when dealing with gases under pressure. As the bulk is increased about 800 times during evaporation, a change of atmosphere is also provided for through the vent pipe $20^a$ extending from a point near the top at $20^b$ downward through the usual drain outlet through the bottom at $20^c$. I propose to provide an adjustable heat leak by means of which heat is transferred from the external atmosphere to the body of the liquefied gas and in this way to control the rate of transfer of such heat and the rate of evaporation. I propose to provide a heat conductor, which is normally out of heat conducting relationship with the body of liquefied gas but which the user may bring into such relationship when he desires to start the operation of the apparatus by supplying the heat necessary for evaporation. The area of radiating surface exposed to the external atmosphere, and in heat conducting relationship with said heat conductor, controls, very largely, the rate at which heat is transferred to the body of liquefied gas to be evaporated and controls the rate of evaporation and I propose to vary the rate of evaporation, and control the degree of refrigeration, by means of a number of auxiliary conductors which may be brought into heat-conducting relationship with said primary heat conductor, as the user may desire. These auxiliary conductors have exposed radiating surfaces and, when they are brought into heat-conducting relationship with the primary conductor, heat will be transferred to the body of liquefied gas at a faster rate and the rate of evaporation will be increased. In this way, I propose to provide means by which the user has a very complete control of the rate at which the liquefied gas will be evaporated and, consequently, the degree of refrigeration produced by the apparatus.

Broadly considered, my invention may be carried out with a single container having a liquefied gas therein, but another feature of my invention consists in providing a plurality of containers which are normally heat-insulated so that no heat will be transferred to the body of liquefied gas therein from the external atmosphere. These containers may hold the same or different gases in liquid state and I propose to provide means by which the user may evaporate the gas from one or another of these containers, or from both of them simultaneously, at such rate as he may desire. In the drawings, I have shown two containers and one of them may hold liquid oxygen while the other holds liquid nitrogen. If desired, the liquid nitrogen may be evaporated to flood the refrigerator compartments with nitrogen, which is an inert gas having no chemical action on any substance which might be stored in the refrigerator. Both the gases might be operated simultaneously to evaporate the liquids therein and flood the refrigerator compartments with a mixture of oxygen and nitrogen. By suitable controls, the rate of evaporation of the respective liquids may be regulated so as to discharge into the refrigerator compartments a mixture of oxygen and nitrogen having approximately the proportions found in the normal air. The essential feature of my invention, however, consists in the utilization of liquefied gas under atmospheric pressure and in controlling the rate of evaporation and, consequently, the degree of refrigeration produced, by controlling the rate at which heat is conducted to the body of liquefied gas from the external atmosphere.

In the accompanying drawings, I have shown an apparatus by means of which my invention may be carried into effect. The apparatus illustrated is merely illustrative of one of the many forms which my invention may take and I have referred to it merely for the purpose of describing one specific embodiment of my invention. Referring to the numbered parts of the drawings, I have shown my invention embodied in a refrigerating unit designed to be placed in and used in the ice compartment of a refrigerator of the type commonly employed for household use. The refrigerating unit is indicated generally by the numeral, $A^{10}$. In Fig. 1, I have shown a refrigerator $A^{11}$, which may be of any of the usual forms but is preferably of the type having double walls to provide a partial insulation from external heat. I have shown the refrigerating unit, $A^{10}$, installed in the ice compartment, $A^{12}$, of the refrigerator so as to cool the refrigerator and cause a flow of cold gas to the several storage compartments, 14, 16, 17 and 19. The partitions between these compartments may be perforated, as at 15 and 18, to permit the passage of currents of cold gas therethrough. Openings, 13, may be provided in the partition separating the compartment, $A^{12}$, from the compartment, 14, arranged so as to align with the openings, 111, in the side wall of the refrigerating unit, through which cold gas may be discharged from the unit into the refrigerator. A passage, 20, may be formed in the outer wall of the refrigerator with its upper end in line with the openings, 111, in the adjacent side wall of the unit, $A^{10}$, and its lower end communicating with the compartment, 17, beneath the unit. By means of this passage, the compartment, 17, may be flooded with the gas produced by the evaporation of the liquid in one of the containers of the refrigerating unit.

The refrigerating unit illustrated comprises a casing, 21, having a top wall, 132, provided with openings, 133, through which the containers may be filled. These openings may be closed by the sliding closures, 134. The partitions, 135, form a pair of chambers at the top of the casing, 21, into which the necks of the containers extend, as will be described more fully hereinafter. Within the casing, the two containers, 22, are mounted, as shown in Fig. 3. These containers hold the liquefied gas, the evaporation of which causes the reduction in temperature within the refrigerator. These containers should be so constructed as to control the transfer of heat from the external atmosphere to the body of liquefied gas which they contain and, to that end, they have the spaced walls, 23, 24 and 25, the air being exhausted from the spaces between the walls so as to provide a high degree of insulation against the transfer of heat to the interior. The neck portions of the containers, 22, consist of the spaced walls, 26, 27 and 28, which are preferably made of a metal or an alloy which is a relatively poor conductor of heat. The spaces between the walls of the containers, from which the air has been exhausted, are sealed by the ring plugs, 29 and 30, which are preferably made of a metal or alloy which is a poor heat conductor. The containers are open to the atmosphere through the neck portions and it is to be noted that the passage through the neck tapers to a constricted throat, 31, and then flares outwardly, as at 32, for convenience in filling. This form appears to have some advantages from the standpoint of restraining the evaporation of the liquefied gas in the container. A U tube 136, preferably of some material which is a poor conductor of heat, is provided in the neck of each container and extends over the top of the triple walls, then down a considerable distance, as an additional means of safety against any possible stoppage of the neck opening, as any confined evaporation of liquid gas within the container would strain the walls and eventually cause them to break. The two containers are arranged side by side and are connected by the concentric T members consisting of the concentric tubes, 33, 34 and 35, which connect the containers and the forwardly extending portions, 36, 37 and 38. The inner tubular portion 35 is connected to the inner walls 23 of the containers 22 and has the forwardly extending tubular portion 38. The tubular portion 34 is connected to the intermediate walls 24 of the containers and has the forwardly extending portion 37. The tubular portion 33 is connected to the outer walls 25 of the containers and has the forwardly extending tubular portion 36. It will be seen that these tubular portions are concentric and spaced from each other, the spaces between such portions communicating with the spaces between the walls of the containers. The tubular portions, 33, 34 and 35, and the connected tubular portions 36, 37 and 38 are preferably made out of a metal or alloy which is a poor conductor of heat, and the spaces between these walls are sealed by the annular plugs 39 and 40 which are also made of a metal or alloy which is a poor heat conductor.

Figures 4, 11:
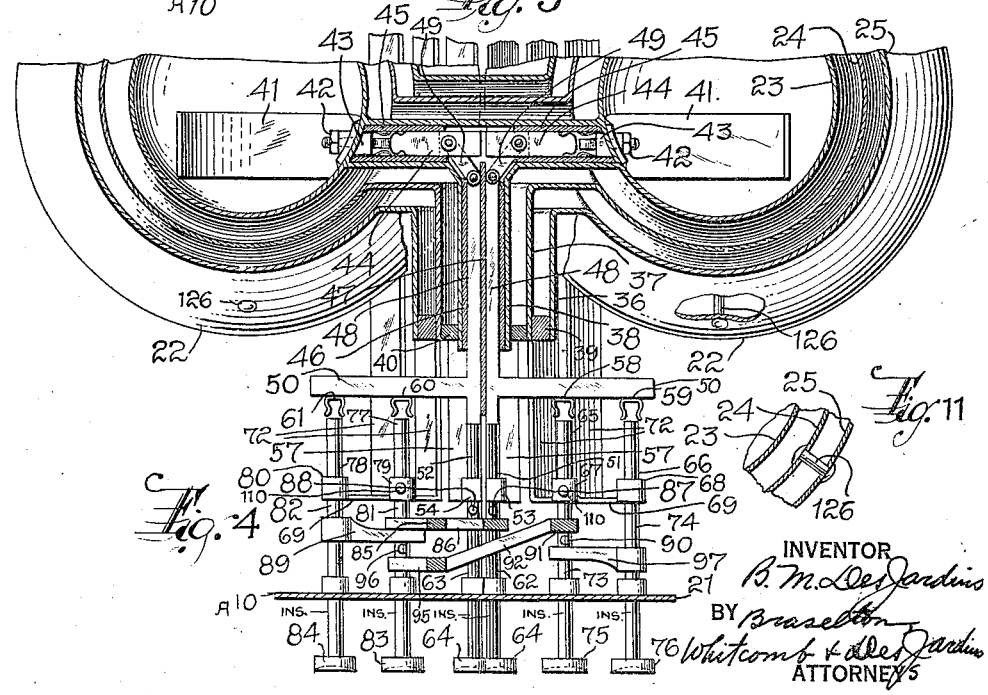
Fig. 4 is a fragmentary, horizontal, sectional view, taken substantially on the line 4—4 of Fig. 3.
Fig. 11 is a detail, sectional view taken on the line 11—11 of Fig. 3 and showing a means for detecting a leak in the walls of the heat-insulating container.

Within each of the containers 22 there is arranged a metal strip 41 formed of metal which is a good conductor of heat. These strips 41 are connected to contacts 43 by means of the bolts 42 passing through the inner walls 23, the contacts being arranged within the tubular portion 35. Sleeves 45 of heat insulating material are arranged within the tubular portion 35. Within these sleeves 45 the bars 44 are slidably mounted so that they may be moved into and out of heat transferring contact with the contacts 43. These bars 44 are made of a metal or alloy which is a good conductor of heat. Within the tubular portion 38 a sleeve 46 of heat insulating material is positioned and the rods 48 are slidably mounted within this sleeve, these rods being separated from each other by a partition 47 of heat insulating material. The inner ends of the rods 48 are connected to the sliding bars 44 by links 49, and the bars 44 are of such length that, when the rods 48 are moved inwardly to the limit of their movement, the rods will lie between the adjacent ends of the bars 44 and in contact with such ends. Each of the rods 48 has a laterally extending arm 50 with which auxiliary conductors may be brought into contact to increase the effective radiating surface through which heat is transferred from the external atmosphere to the body of liquefied gas. In order to move the rods 48 in and out, they are provided with stems 51 and 52 having extensions 62 and 63 extending from the front wall of the casing 21 and carrying the keys 64. These extensions are made of heat insulating material. The collars 53 and 54 are secured to the stems 51 and 52 as shown in Figs. 4 and 6, and these collars carry the strips 55 and 56 (Fig. 5) which have the portions 57 extending rearwardly beneath the containers 22 and providing a comparatively extended radiating surface for the absorption of heat from the external atmosphere, for transfer to the liquefied gas within the containers when the bars 44 are moved to position to make heat transferring engagement with the contacts 43. It will be observed that the bars 48 may be actuated independently of each other, and that these bars provide a controllable heat leak by means of which heat may be transferred to the liquefied gas at the will of the operator.

In order to control the rate at which heat is conducted to the body of liquefied gas and, consequently, to control the rate of evaporation of such liquefied gas, I have provided means for varying the effective radiating surface in heat conducting relation with the rods 48 and the bars 44. This consists of the auxiliary conductors 65, 66, 77 and 78 which may be brought into heat conducting or transferring relation with the contacts 58, 59, 60 and 61 fastened on the arms 50 extending from the rods 48. Each of these auxiliary conductors is in the form of a rod extending forwardly, as shown in Fig. 4, and these rods have secured thereto the collars 67, 68, 79 and 80 to which are secured the strips 69 having the rearwardly extending portions 72 which extend beneath the containers 22, as shown in Fig. 3. These strips provide extended radiating surfaces which are brought into heat conducting relationship with the primary conductor bars 44 and 48 when the rods 65, 66, 77 and 78 are brought into heat transferring relation with the contacts 58, 59, 60 and 61 arranged on the arms 50 of the primary conductors. By means of these auxiliary conductors, the radiating surface through which heat is absorbed and, consequently, the rate at which heat is transmitted to the body of liquefied gas, may be increased at the will of the operator so as to vary the rate of evaporation of such liquefied gas. These rods 65, 66, 77 and 78 have stems 73, 74, 81 and 82, which are made of heat insulating material and extend through the forward wall of the casing 21, carrying, outside of said casing, the keys 75, 76, 83 and 84 by which these stems may be actuated. These are pulled out full distance by hand till the tips of the conductors 65, 66, 77 and 78 are pulled out of the contacts 58, 59, 60 and 61.

I have found it desirable to provide connections between these stems 62, 63, 73, 74, 81 and 82 so that the depression of any one of the keys on these stems will bring into heat-transferring relation with the body of liquefied gas, heat conductors of such capacity as to transfer heat to the body of gas at a predetermined rate. In other words, by referring to Fig. 2, it will be seen that the keys 64 have the legend "Cool" under them. The key 83 has the legend "Cooler" under it. The key 84 has the legend "Cold". The key 75 has the legend "Chill" and the key 76 has the legend "Frost". These legends are intended to express the varying degrees of refrigeration, to be produced in the refrigerator by this refrigerating unit, running from "Cool" to "Frost". I propose to provide control means such that, if, for instance, the key 75 is depressed, the keys 84, 83 and 64 will be automatically depressed with it, so as to throw into heat conducting relation with the strips 41 within the containers, all of the primary and auxiliary conductors controlled by the keys 64, 83, 84 and 75. Similarly, if the key 76 is depressed, it throws automatically into heat conducting relation, all of the conductors controlled by the keys 64, 83, 84, 75 and 76. In order to accomplish this, I have provided, in this embodiment of my invention, the pins, 87 and 88, on the stems, 62 and 63 and a swinging gate, 85, having an arm 86 and portions 85' and 86' which are hinged on the pin 93 carried by the bracket 94', secured to the front wall of the casing 21. The arm 86 extends in front of the pins 87 and 88 so that, when it is swung rearwardly, the stems 51 and 52 will be moved rearwardly to bring the conductors 44 into heat conducting relation with the contacts 43. An arm 89, fastened on the stem 82, extends in front of the arm 85 of the swinging gate, so that, when the key 84 and its stem 82 is moved rearwardly, the arm 89 will engage and swing the gate 85 so as to depress or move rearwardly the stems 51 and 52 with their keys 64 at the same time. Consequently, when the operator depresses the key 84, it brings both the conductors 44 into engagement with the contact 43 and also brings the auxiliary conductor 78 into engagement with the contact 61 on the arm 50. A pin 96 is fixed on the stem 81 in front of the arm 89. Consequently, when the key 83 is depressed, both the conductors 44 will be brought into engagement with the contacts 43 and the auxiliary conductors 77 and 78 will be brought into engagement with the contacts 60 and 61. A swinging gate 91, which is also hinged upon the pin 93, has one arm 92 extending over the stem 73 just in the rear of a pin 90 on said stem. The other arm 95, of said gate, extends over the stem 81 just in front of the pin 96. Consequently, when the key 75 is depressed, the gate 91 will be swung rearwardly and the arm 95 engages the pin 96 causing the stem 81 to be moved rearwardly. As a result, when the key 75 is depressed, both the conductors 44 will be brought into engagement with the contacts 43, and the auxiliary conductors 77, 78 and 65 will be brought into engagement with the contacts 58, 60 and 61. An arm 97 is fastened on the stem 74 and extends just in front of the pin 90. Consequently, when the key 76 is depressed, both the conductors 44 will be brought into engagement with the contacts 43, and all of the auxiliary conductors 65, 66, 77 and 78 will be brought into engagement with the contacts 58, 59, 60 and 61. It will be seen that this provides a graduated control of the rate at which heat will be transferred from the external atmosphere to the body of liquefied gas within the containers, and that, therefore, the rate of evaporation is controlled and the reduction of temperature may be regulated or governed by the user. The control means which I have shown here is illustrative only, and I am not to be restricted to the specific form of control mechanism.

As will appear from Fig. 3, the gases resulting from the evaporation of the liquids in the containers 22 will escape into the chambers formed at the top of the casing 21. These chambers communicate with each other through the openings 111' and they communicate with the storage compartments of the refrigerator through the openings 111. These chambers also communicate with the lower part of the casing of the refrigerating unit through the openings, 112. It is to be noted that the cold gas resulting from the evaporation of the liquid in the container may be discharged within the chamber surrounding the container and that the heat necessary for evaporation is abstracted from this comparatively cold atmosphere, thus securing better regulation. The lower chamber within the refrigerating unit communicates with the storage compartments of the refrigerator through the openings, 137, formed in the bottom wall of the unit, $A^{10}$. These various openings may be controlled in any suitable way, for instance, by sliding dampers. In this embodiment, the dampers controlling the upper openings take the form of angle members having the portions, 113, which close the openings, 112, and the portions, 114, which close the openings, 111. The openings, 137, are controlled by the sliding damper, 139, having openings, 138, therein. I have provided suitable connections by which the operator may adjust these dampers to control the circulation of the gases escaping from the containers. These connections are shown in Fig. 6 and, for the upper dampers, include the stems, 115, which extend through the front wall of the casing, 21, and have the buttons, 116, thereon. The dampers, 139, extend through the front wall of casing, 21, and have the turned-up ears, 140, by which they can be adjusted. The rear ends of the stems, 115, are connected through lugs, 121, to the portions, 113, of the sliding dampers. I desire to provide means by which, when the dampers are moved to open position, an auxiliary heat leak will be thrown into heat conducting relation with the body of liquefied gas within the containers, or either one of them, so as to result in the evaporation of the liquefied gas in the container to which heat is thus transferred. This auxiliary heat leak consists of a bar 98, so positioned that it may rest upon the arm 50 of the rod 48. This bar has an upwardly extending portion 101 which is slidably mounted in guideways 102, secured to the casing. This upwardly extending portion provides an extended radiating surface for the absorption of heat from the atmosphere for transfer through the bar to the body of liquefied gas. This portion is also provided with a lateral lug 100, which is so positioned that it lies in front of the corresponding one of the pins 110, mounted on the collars 67 and 79. That prevents the depression of the auxiliary conductor keys when this auxiliary heat leak is brought into use. It will be understood that this auxiliary heat leak is used when it is desired to evaporate the gas from one of the containers so as, for instance, to flood the compartments of the refrigerator with nitrogen. A cam 123 is mounted on the stem 115, and engages a part 124 on the upwardly extending portion 101, of the auxiliary heat leak. When the stem 115 is moved rearwardly, to open the openings 111, and close the openings 112, as shown in Fig. 7, the engagement of the part 124 with the cam 123 permits the auxiliary heat leak to be lowered into contact with the arm 50 upon the rod 48 corresponding to the stem 115. It will be observed that there are two of these stems 115 and keys 116, one for each of these containers, and the depression of one of these keys opens the openings 111 on the corresponding side of the casing and nearly closes the openings 112 on that side of the casing, so that the gas flowing from the container passes out through the openings 111. This same movement lowers the heat leak upon the arm 50 of the conductor 48, which is brought into heat conducting relation with that container.

I also provide means by which the dampers may be adjusted by means of the keys 116, without lowering the heat leak into operative position. These means consist of the stem, 105, which is slidably mounted in the casing 21, and provided with a cam surface 104 which cooperates with the roller 103 mounted on the upwardly extending portion 101 of the auxiliary heat leak. This stem, 105, which extends through the front wall of the casing, carries a button 108. When this key is pulled out it will be observed that the roller 103 engages the upper surface of the cam, 104, and prevents the lowering of the auxiliary heat leak when the dampers are adjusted.

I find it desirable to provide means to indicate when the containers are not in perfect condition. If there is an accidental leakage of heat which will result in the wasteful evaporation of the liquefied gas in the container or danger of excessive freezing it will be indicated as follows. I have provided pins 126 of comparatively small cross section, which connect the outer wall 25 with the intermediate wall 24 and form a leak between the outer surface of the said wall 25, which is exposed to the atmosphere, and the inner surface of the wall 24 which in case of a break in the wall 23, is now in contact with the liquid. Whenever a break occurs which would destroy the vacuum between the inner wall 23 and the intermediate wall 24, this break will result in the conduction of heat through the pin 126 to the intermediate wall and the formation of a frost spot on the outer wall 25 adjacent the end of the pin 126. These pins are located upon the containers so that their ends will be visible from the openings 125 in the front walls of the casing 21. Consequently, the user can observe the containers through these openings, and, if the appearance of a frost spot adjacent the end of the pin is noted, this will indicate to the user that the container is defective and that they should be replaced in order to avoid a wasteful evaporation of the liquefied gas which they hold, and prevent excessive freezing.

In Figs. 9 and 10, I have shown a modified form of adjustable or controllable heat leak which is embraced within the spirit of my invention and constitutes a modified form thereof. A sleeve 127 is provided which extends through the outer wall 25 and the intermediate wall 24 of the container into engagement with the inner wall 23. This provides a tubular passage or short neck, 120, through which the inner wall is in contact with the atmosphere, but I propose to conduct the heat from the exterior, by a plug 128 of heat conducting material. The plug 128 is provided with a central passage through which a plug 129 may be inserted, which plug is also formed of material which is a good conductor of heat. It will be apparent that the insertion of the plug 129 will decrease the rate of transfer of heat from the exterior to the contents of the container and will increase the rate of evaporation of the same. When the plug 129 is not in use the tubular passage in the plug 128 may be closed by the closure 130 fastened to a spring arm 131 which is secured to the outer wall 125 of the container.

The sleeve, 127, and the closure, 130, may very well be formed of a metal or alloy which is a poor conductor of heat and the closure may be used as a cover to check the flow of air through the short neck, 120, when evaporation is not desired. If desired, a series of plugs, 128, may be used having passages of different diameters and sizes so that they may be used in this way, to vary the rate of transfer of heat to the contents of the container, or one or more calibrated pins or rivets such as that shown at 126, may be employed for this purpose.

It will be observed that I have provided a refrigerating unit in which the liquefied gas utilized is maintained at atmospheric pressure and in which there are no expensive or complicated coils or containers such as are needed when dealing with gases or liquids confined under pressure. The evaporation of the liquefied gas which produces the reduction in temperature is controlled by controlling the rate of evaporation of this gas and this rate of evaporation is controlled by regulating or governing the rate of transfer of heat from the external atmosphere to the body of liquefied gas. I control this evaporation by an adjustable heat leak. When the primary heat conductor is brought into engagement with the contact 43, the minimum quantity of heat per second is transferred to the contents of the corresponding container. By bringing the auxiliary conductors into engagement with the primary conductors, the effective radiating surface is increased and the rate of transfer of heat is correspondingly increased, thereby increasing the rate of evaporation. I have also provided means by which the contents of either of the containers may be evaporated independently of the other so that, for instance, if liquid nitrogen is used in one of the containers, it may be evaporated and directed into storage compartments of the refrigerator in order to flood them with an inert gas. If desired, both liquid oxygen and liquid nitrogen may be used, and the auxiliary heat leaks may be so proportioned that the rate of evaporation of the liquid oxygen bears such a relation to the rate of evaporation of the liquid nitrogen that these gases will be evaporated simultaneously in proportions corresponding to that in which they are present in normal air. In this way, my aparatus is capable of flooding the compartments of the refrigerator with air reconstituted by the evaporation of these two gases.

The specific arrangement which I have shown is not the only means by which this invention may be carried into effect, but I have illustrated it and described it as being well calculated for carrying out the invention. I am not to be restricted to it, however, and I am aware that this particular embodiment may be varied considerably without departing from the spirit of my invention. I desire, therefore, to claim my invention broadly as indicated by the appended claims.

Having thus described my invention, what I claim as new and useful, and desire to secure by Letters Patent is:

1. A refrigerating apparatus comprising a vacuum wall container for a body of liquefied gas, and a calibrated heat leak extending through the wall of said container for transferring heat to said body of liquefied gas at a predetermined rate, said heat leak being adjustable to vary the rate of conduction of heat to said body.

2. A refrigerating apparatus comprising a vacuum wall container for a body of liquified gas, and an adjustable heat leak extending through the wall of said container for transferring heat to said body of liquefied gas at predetermined rates.

3. A refrigerating apparatus comprising a vacuum wall container for a body of liquefied gas, a primary heat conductor, means for bringing said primary heat conductor into heat conducting relationship with said body of liquefied gas, auxiliary heat conductors, and means for placing said auxiliary heat conductors in heat conducting relation with the primary conductor.

4. A refrigerating apparatus comprising a vacuum wall container for a body of liquefied gas, said container permitting the free escape of the gas resulting from the vaporization of said liquid, and a heat leak for supplying heat to said body of liquefied gas at a predetermined rate whereby the rate of evaporation thereof is controlled.

5. A refrigerating apparatus comprising a casing forming a chamber, a heat insulated container discharging within said chamber and adapted to hold a body of liquefied gas, and a heat leak for transmitting heat from the atmosphere of said chamber to said body of liquefied gas at a predetermined rate whereby the rate of evaporation thereof is controlled.

6. A refrigerating apparatus comprising a casing divided into a lower and an upper chamber, a heat insulating container for a body of liquefied gas, said container being positioned within the lower chamber and discharging the vaporized gas into the upper chamber, and controllable means for transmitting heat from the atmosphere of the lower chamber to said body of liquefied gas.

7. A refrigerating apparatus comprising a casing divided into a lower and an upper chamber, means for controlling the communication between said chambers, a heat insulating container for a body of liquefied gas positioned in the lower chamber and discharging into the upper chamber, and means for controlling the transfer of heat from the atmosphere of the lower chamber to the body of liquefied gas.

8. The combination with a refrigerator having storage compartments, and a compartment for receiving a refrigerant, of a refrigerating unit removably positioned within the latter compartment and including a heat insulated container for a body of liquefied gas, and means for controlling the absorption of heat from said storage compartments by said body of liquefied gas.

9. The combination with a refrigerator including a plurality of storage compartments, and a compartment for receiving a refrigerant of a refrigerating unit positioned in the latter compartment and including a heat insulated container for a body of liquefied gas, said container permitting the free escape of the vaporized gas, and means for controlling the rate of absorption of heat from said storage compartments by said liquefied gas.

10. A refrigerating apparatus comprising a pair of heat insulated containers, each adapted to hold a body of liquedfied gas, and a common control means for regulating the rate of evaporation of said liquefied gas including adjustable heat leak mechanism for transferring heat to either or both of said bodies of liquefied gas at predetermined rates.

11. A refrigerating apparatus comprising a casing having upper and lower chambers therein, a heat insulated container for a body of liquefied gas positioned in the lower chamber and discharging into the upper chamber, means for controlling the communication between said chambers, and heat leak mechanism automatically actuated by said controlling means for transferring heat to the body of liquefied gas.

12. A refrigerating apparatus comprising a heat insulating container having a constricted neck adapted to contain a body of liquefied gas, controllable means for evaporating said body of liquefied gas, and means for facilitating the free escape of the vaporized gases comprising a vent tube, inserted in said neck past the constricted portion thereof.

13. A refrigerating apparatus comprising a vacuum wall container for a body of liquefied gas, and a plurality of heat leak members which may be selectively brought into heat conducting relationship with said body of gas to vary the rate of transfer of heat thereto.

14. The process of refrigeration comprising the insulation of a body of liquefied gas from external heat, and the transfer of the external heat thereto at a predetermined rate.

15. The process of refrigeration comprising the insulation of a body of liquefied gas from external heat, and controlling and varying the rate of transfer of external heat to said body of liquefied gas.

16. A refrigerating apparatus comprising a heat-insulated container for a body of liquefied gas, a primary heat conductor, means for bringing said primary heat conductor into heat conducting relationship with said body of liquefied gas, auxiliary heat conductors, and means for placing said auxiliary heat conductors in heat conducting relation with the primary conductor.

17. A refrigerating apparatus comprising a casing divided into a plurality of chambers, means for controlling the communication between said chambers, a heat-insulated container for a body of liquefied gas positioned in one of said chambers and discharging into another, and means for controlling the transfer of heat from the atmosphere of the first of said chambers to the body of liquefied gas.

18. A refrigerating apparatus comprising a casing having a plurality of chambers therein, a heat-insulated container for a body of liquefied gas positioned in one of said chambers and discharging into another, means for controlling the communication between said chambers, and heat leak mechanism automatically actuated by said controlling means for transferring heat to the body of liquefied gas.

19. A refrigerating apparatus comprising a heat-insulated container for a body of liquefied gas, a heat leak extending from said body to the outside air, and means controlling the rate of conduction of heat through said heat leak from the outside air to the body of the liquefied gas.

20. A refrigerating apparatus comprising a heat-insulated container for a body of liquefied gas, a heat leak extending from said body to the outside atmosphere, and means for varying the area of radiating surface exposed to the outer atmosphere and in heat conducting relation to said heat leak.

In testimony whereof, I affix my signature.

BENJAMIN M. DES JARDINS.